United States Patent [19]

Buss et al.

[11] Patent Number: 4,608,356

[45] Date of Patent: Aug. 26, 1986

[54] PREPARATION OF A REFORMING CATALYST

[75] Inventors: Waldeen C. Buss, Kensington; Charles R. Wilson, San Francisco, both of Calif.

[73] Assignee: Chevron Research Company, San Francisco, Calif.

[21] Appl. No.: 684,316

[22] Filed: Dec. 20, 1984

[51] Int. Cl.$^4$ .............................................. B01J 29/06
[52] U.S. Cl. .......................................... 502/66; 502/74
[58] Field of Search .................................. 502/66, 74

[56] References Cited

U.S. PATENT DOCUMENTS

| 3,257,310 | 6/1966 | Plank et al. | 502/85 |
| 3,259,564 | 7/1966 | Kimberlin, Jr. | 502/66 X |
| 3,392,124 | 7/1968 | Laurent | 502/74 |
| 3,546,102 | 12/1970 | Bertolacini | 502/66 X |
| 3,574,092 | 4/1971 | Mitsche | 502/66 X |
| 3,929,672 | 12/1975 | Ward | 502/66 |

Primary Examiner—Carl F. Dees
Attorney, Agent, or Firm—S. R. La Paglia; E. A. Schaal; P. L. McGarrigle, Jr.

[57] ABSTRACT

A method of preparing a reforming catalyst is disclosed wherein a large-pore zeolite is impregnated with an aqueous solution of platinum and the zeolite is only allowed to soak in the solution for less than three hours to form a catalyst. After the catalyst is dried, it is calcined in an atmosphere containing steam.

8 Claims, No Drawings

PREPARATION OF A REFORMING CATALYST

BACKGROUND OF THE INVENTION

The present invention concerns a method for preparing a reforming catalyst having increased conversion and increased selectivity for dehydrocyclization.

Catalytic reforming is a well known process that is used for raising the octane rating of a naphtha for gasoline. The reactions that occur during reforming include: dehydrogenation of cyclohexanes, dehydroisomerization of alkylcyclopentanes, dehydrocyclization of acyclic hydrocarbons, dealkylation of alkylbenzenes, isomerization of paraffins, and hydrocracking of paraffins. The hydrocracking reaction should be suppressed because that reaction lowers the yield of hydrogen and lowers the yield of liquid products.

Reforming catalysts must be selective for dehydrocyclization, in order to produce high yields of liquid product and low yields of light gases. These catalysts should possess good activity, so that low temperatures can be used in the reformer. Also, they should possess good stability, so that they can maintain a high activity and a high selectivity for dehydrocyclization over a long period of time.

While most reforming catalysts contain platinum on an alumina support, large-pore zeolites have been proposed as supports. These large-pore zeolites have pores large enough for hydrocarbons in the gasoline boiling range to pass through. Catalysts based on these zeolitic supports have been commercially unsuccessful.

SUMMARY OF THE INVENTION

The present invention is an improvement on the process for producing a zeolitic reforming catalyst by the steps of mixing a large-pore zeolite with an inorganic oxide binder; extruding the mixture to form an extrudate; drying and calcining the extrudate; impregnating the calcined extrudate with an aqueous solution of a Group VIII metal to form a catalyst; and drying and calcining the catalyst in the presence of steam. The present invention is based on the discovery that a better zeolitic reforming catalyst can be produced by this process if: (1) the impregnated extrudate is only allowed to soak in the impregnation solution for less than three hours, and (2) the atmosphere of the final calcination step includes steam.

Preferably, the reforming catalyst is prepared by the steps of mixing a type L zeolite with an alumina binder to form a mixture, extruding the mixture to form an extrudate, drying and calcining the extrudate, ion exchanging the calcined extrudate with an aqueous solution of barium, drying and calcining the ion exchanged extrudate, impregnating the calcined extrudate with an aqueous solution of platinum and allowing the extrudate to soak for one hour or less to form a catalyst, drying the catalyst, and calcining the dried catalyst with at least 3% steam.

DESCRIPTION OF THE PREFERRED EMBODIMENTS

In its broadest aspect, the present invention involves a method of preparing a reforming catalyst by impregnating a large-pore zeolite with an aqueous solution of a Group VIII metal and allowing the zeolite to soak in the solution for less than three hours to form a catalyst, drying the catalyst, and calcining the dried catalyst in the presence of steam. Either an extruded catalyst or an unextruded catalyst can be formed. When an extruded catalyst is formed, it is prepared by mixing a large-pore zeolite with an inorganic oxide binder, extruding the mixture to form an extrudate, drying and calcining the extrudate, impregnating the calcined extrudate with an aqueous solution of a Group VIII metal and allowing the extrudate to soak for one hour or less to form a catalyst, drying the catalyst, and calcining the dried catalyst in a mixture of steam and air.

The term "selectivity" as used in the present invention is defined as the percentage of moles of paraffin converted to aromatics relative to moles converted to aromatics and cracked products, $$\text{i.e., Selectivity} = \frac{100 \times \text{moles of paraffins converted to aromatics}}{\text{moles of paraffins converted to aromatics and cracked products}}$$

Isomerization reactions are not considered in this definition of selectivity.

The term "large-pore zeolite" is defined as a zeolite having an effective pore diameter of from 6 to 15 Angstroms. The preferred pore diameter is from 7 to 9 Angstroms. Type L zeolite, zeolite X, and zeolite Y are thought to be the best large-pore zeolites for this operation. Type L zeolite is described in U.S. Pat. No. 3,216,789. Zeolite X is described in U.S. Pat. No. 2,882,244. Zeolite Y is described in U.S. Pat. No. 3,130,007. U.S. Pat. Nos. 3,216,789; 2,882,244; and 3,130,007 are hereby incorporated by reference to show zeolites useful in the present invention. The preferred zeolite is type L zeolite.

An inorganic oxide can be used as a carrier to bind the large-pore zeolite. This carrier can be natural, synthetically produced, or a combination of the two. Preferred loadings of inorganic oxide are from 5% to 50% of the weight of the catalyst. Useful carriers include silica, alumina, aluminosilicates, and clays. Preferably, the carrier is an alumina binder. The inorganic oxide is mixed with the large-pore zeolite to form a mixture, then the mixture is extruded to form an extrudate, and then the extrudate is dried and calcined.

Type L zeolites are synthesized largely in the potassium form. These potassium cations are exchangeable, so that other type L zeolites can be obtained by ion exchanging the type L zeolite with appropriate solutions. It is difficult to exchange all of the original cations, since some of these cations are in sites which are difficult to reach. Preferably, the potassium in the calcined extrudate is ion exchanged with an alkaline earth metal, which can be either barium, strontium, or calcium, then the ion exchanged extrudate is dried and calcined. Barium is the preferred alkaline earth metal because the resulting catalyst has a high activity, a high selectivity for dehydrocyclization, and a high stability. Preferably, the barium should constitute from 0.1% to 35% of the weight of the zeolite, more preferably from 1% to 20%.

Then the ion exchanged large-pore zeolite is impregnated or ion exchanged with at least one Group VIII metal. The preferred Group VIII metal is platinum, which is more selective for dehydrocyclization and which is more stable under reforming reaction conditions than other Group VIII metals. The catalyst should contain between 0.1% and 5% platinum of the weight of the catalyst, preferably from 0.2% to 1.0%. An essential part of this invention is that the ion exchanged extrudate only be allowed to soak for one hour or less.

After impregnation, the catalyst is dried and calcined. The calcination step is with steam in an atmosphere, such as in air. Preferably, the atmosphere contains at least 3% by weight steam.

This catalyst can be used in a reforming process. The feed used in this reforming process is a naphtha that contains at least some acyclic hydrocarbons or alkylcyclopentanes. This feed should be substantially free of sulfur, nitrogen, metals, and other known poisons. These poisons can be removed by first using conventional hydrofining techniques, then using sorbents to remove the remaining sulfur compounds.

In the reforming process, the feed can be contacted with the catalyst in either a fixed bed system, a moving bed system, a fluidized system, or a batch system. Either a fixed bed system or a moving bed system is preferred. In a fixed bed system, the preheated feed is passed into at least one reactor that contains a fixed bed of the catalyst. The flow of the feed can be either upward, downward, or radial. The pressure is from about 1 atmosphere to about 500 psig, with the preferred pressure being from about 5 psig to about 200 psig. The temperature is from 400° C. to 600° C., with the preferred temperature being from about 450° C. to about 550° C. The liquid hourly space velocity (LHSV) is from about 0.1 $hr^{-1}$ to about 10 $hr^{-1}$, with a preferred LHSV of from about 0.3 $hr^{-1}$ to about 5 $hr^{-1}$. Enough hydrogen is used to insure an $H_2/HC$ ratio of up to about 20:1. The preferred $H_2/HC$ ratio is from about 1:1 to about 6:1. Reforming produces hydrogen. Thus, additional hydrogen is not needed except when the catalyst is pre-reduced and when the feed is first introduced. Once reforming is underway, part of the hydrogen that is produced is recycled over the catalyst.

EXAMPLES

The invention will be further illustrated by the following examples which set forth particularly advantageous method and composition embodiments. While the examples are provided to illustrate the present invention, they are not intended to limit it.

PREPARATION OF THE CATALYST

A barium-exchanged extrudate was prepared by ion exchanging a potassium-type L zeolite extrudate with a sufficient volume of barium nitrate solution to contain an excess of barium compared to the ion exchange capacity of the zeolite, drying the resulting barium-exchanged zeolite, calcining the dried zeolite at 590 degrees Celsius, and extruding the calcined zeolite with an alumina binder.

A sample of the calcined, barium-exchanged extrudate was impregnated with sufficient tetrammine platinum nitrate (dissolved in a volume of water to match the pore volume of the extrudate) to yield a 0.64 weight percent platinum on a volatile free basis. The impregnated sample was divided into three portions (labeled A, B, and C), and these three portions were allowed to soak for one, three, and sixteen hours respectively. These portions were then respectively dried at 250 degrees Fahrenheit for sixteen hours in a convection oven. After drying, portion B was then further divided into three portions, labeled B1, B2, and B3.

Portions A, B1, and C were then calcined in flowing dry air (air flow rate of 100 cc/min/20 g catalyst) at 500 degrees Fahrenheit for two hours to yield catalysts A, B1, and C (Table I) respectively. Portion B2 was calcined at 500 degrees Fahrenheit in air which had been saturated with water at room temperature (approximately 3% water) for two hours (air flow rate of 100 cc/min/20 g catalyst) to yield catalyst B2 (Table II). Portion B3 was calcined for two hours at 500 degrees Fahrenheit in a 50% steam/air mixture (air flow rate of 200 cc/min/20 g of catalyst) to yield catalyst B3 (Table II).

Prior to use, each catalyst was pretreated in a hydrogen atmosphere at from one to three atmospheres pressure for thirty minutes at 400 degrees Fahrenheit, then for ten to fifteen minutes at 700 degrees Fahrenheit, then for one hour at 920 degrees Fahrenheit.

TEST OF THE CATALYSTS

An Arabian Light straight run naphtha which had been hydrofined to remove sulfur, oxygen, and nitrogen was reformed at 100 psig, 920 degrees Fahrenheit, 6 LHSV, and 6 $H_2/HC$ using the five different catalysts A, B1, B2, B3, and C. The feed contained 80.9 v% paraffins, 16.8 v% naphthenes, and 1.7 v% aromatics, and it contained 2.6 v% $C_5$, 47.6 v% $C_6$, 43.4 v% $C_7$, 6.3 v% $C_8$, and 0.1 v% $C_9$.

TABLE I
EFFECT OF SOAK TIME

| | | Results at 3/20 hours | |
|---|---|---|---|
| Example | Soak Time, hrs | Conversion of $C_6$+ Paraffins, mole % | Selectivity for Paraffins to Aromatics |
| A | 1 | 63/52 | 79/81 |
| B1 | 3 | 55/40 | 75/77 |
| C | 16 | 42/30 | 69/70 |

Thus, the soak time should be minimized in order to obtain best conversion and selectivity.

TABLE II
EFFECT OF STEAM DURING CALCINATION

| | | Results at 3/20 hours | |
|---|---|---|---|
| Example | % Water in Air Vol %, gas | Conversion of $C_6$+ Paraffins, mole % | Selectivity for Paraffins to Aromatics |
| B1 | Dry | 55/40 | 75/77 |
| B2 | 3 | 61/47 | 79/80 |
| B3 | 50 | 60/52 | 80/82 |

Thus, steam should be present in the final calcination step in order to obtain best conversion and selectivity.

While the present invention has been described with reference to specific embodiments, this application is intended to cover those changes which may be made by those skilled in the art without departing from the spirit and scope of the appended claims.

What is claimed is:

1. A method of preparing a reforming catalyst comprising the steps of:
    (a) impregnating a large-pore zeolite with an aqueous solution of a Group VIII metal and allowing said zeolite to soak in said solution for less than three hours to form a catalyst;
    (b) drying said catalyst; and
    (c) calcining said dried catalyst in an atmosphere containing steam.

2. A method of preparing a reforming catalyst comprising the steps of:
    (a) mixing a large-pore zeolite with an inorganic oxide binder;

(b) extruding said mixture to form an extrudate;
(c) drying and calcining said extrudate;
(d) impregnating said calcined extrudate with an aqueous solution of a Group VIII metal and allowing said calcined extrudate to soak in said solution for less than three hours to form a catalyst;
(e) drying said catalyst; and
(f) calcining said dried catalyst in an atmosphere contaning steam.

3. A method of preparing a reforming catalyst according to claim 2 wherein said large-pore zeolite has an apparent pore size of from 7 to 9 Angstroms.

4. A method of preparing a reforming catalyst according to claim 3 wherein said large-pore zeolite is selected from the group consisting of zeolite X, zeolite Y, and type L zeolite.

5. A method of preparing a reforming catalyst according to claim 4 wherein said large-pore zeolite is a type L zeolite.

6. A method of preparing a reforming catalyst comprising the steps of:
(a) mixing a type L zeolite with an inorganic oxide binder, wherein said inorganic oxide is selected from the group consisting of silica, alumina, and aluminosilicates;
(b) extruding said mixture to form an extrudate;
(c) drying and calcining said extrudate;
(d) ion exchanging said calcined extrudate with an aqueous solution of an alkaline earth metal selected from the group consisting of barium, strontium, and calcium;
(e) drying and calcining said ion exchanged extrudate;
(f) impregnating said calcined extrudate with an aqueous solution of a Group VIII metal and allowing said calcined extrudate to soak in said solution for less than three hours to form a catalyst;
(g) drying said catalyst; and
(h) calcining said dried catalyst with steam in air, wherein said air has at least 3% steam.

7. A method of preparing a reforming catalyst according to claim 6 wherein said alkaline earth metal is barium and wherein said Group VIII metal is platinum.

8. A method of preparing a reforming catalyst according to claim 7 wherein said catalyst has from 5% to 10% by weight barium and from 0.2% to 1.0% by weight platinum.

* * * * *